July 14, 1964 R. A. HALL 3,141,154

INTELLIGENCE STORAGE EQUIPMENT

Filed June 10, 1960

*Inventor*
R.A . Hall

By Robert Harding
*Attorney*

3,141,154

INTELLIGENCE STORAGE EQUIPMENT

Ralph Anthony Hall, London, England, assignor to International Standard Electric Corporation, New York, N.Y.

Filed June 10, 1960, Ser. No. 35,175
Claims priority, application Great Britain June 26, 1959
7 Claims. (Cl. 340—174)

The present invention relates to intelligence storage equipment in which intelligence is stored on ferro-magnetic storage elements.

Each of these memory elements is a small toroidal core, or the material surrounding a small hole in a plate or block of a ferro-magnetic material having a substantially rectangular hysteresis loop. Such materials are generally known as square-loop materials. In conventional storage equipment using such elements, intelligence in binary form is stored by setting the elements each to either one of two remanent states. To read the condition of such an element in conventional systems, energy is applied thereto such as to drive it to one of these stable states. If the element is already in that state, the application of this energy causes little or no output to be developed in a wire threading the element. However, if the element was in the other of its stable states, the application of the energy reverses its state, with the result that an output is developed which is large compared with any output produced when reading an element whose condition is not reversed by the reading.

Thus it will be seen that the reading of the state of the storage is destructive, i.e., the intelligence stored therein is destroyed when it is read. Therefore it is necessary in such systems to provide apparatus for re-storing the intelligence if it is required for the intelligence to be retained in the storage equipment.

It is an object of the present invention to provide intelligence storage equipment using ferro-magnetic storage elements in which the reading is non-destructive, i.e., in which intelligence can be read without destroying that intelligence.

According to the present invention there is provided an intelligence storage device including two substantially identical ferro-magnetic storage elements each capable of being set to either one of two remanent magnetic states, a read wire and an output wire each threading both of the elements with one of the wires passing through the elements in the same direction magnetically and the other wire passing through the elements in opposite directions magnetically, the arrangement being such that when a pulse is applied to the read wire, which pulse is sufficiently small to cause both elements to traverse only the reversible portions of their hysteresis loops, the resultant of the two output pulses produced in the output wire is of a polarity dependent on the magnetic state to which the storage device was set, and that after the read operation the storage device is in the same magnetic state as it was before the read operation.

The invention will now be described with reference to the accompanying drawings, in which.

Figures 1, 2, 3:
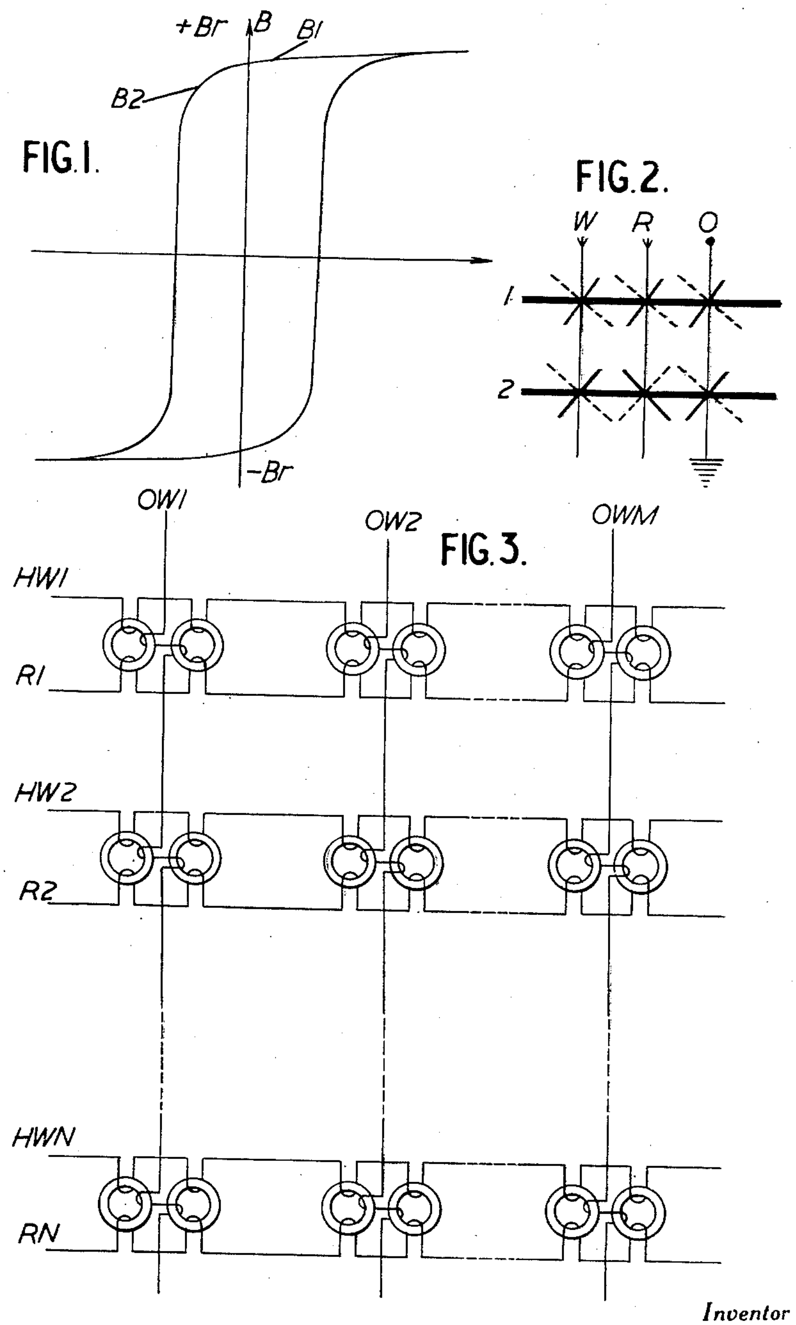
FIG. 1 is a hysteresis loop of a square-loop magnetic material, which will be referred to in the following description.
FIG. 2 shows schematically a storage unit according to the present invention.
FIG. 3 is a schematic representation of a coordinate array of storage units according to the present invention.

In FIG. 2, the horizontal lines 1 and 2 represent the two ferro-magnetic storage elements which form a single storage unit. As indicated in the opening paragraphs, these storage elements are individual toroidal cores of a square-loop magnetic material, or are each formed by the material surrounding a hole in a plate or block of a square-loop material. Preferably the ferro-magnetic material is a "square loop" ferrite.

The storage unit formed by cores 1 and 2 is threaded by a write wire W, a read wire R and an output wire O. Of these wires the write wire W passes through both elements in the same direction magnetically, the output wire O also passes through both elements in the same direction magnetically, and the read winding R passes through the two elements in opposite directions magnetically. The directions in which these wires pass through the elements are indicated schematically by the short oblique strokes at the intersections of the horizontal lines representing the storage elements and the vertical lines representing those wires.

The two elements which form one storage unit are selected to be as near as possible identical. To explain the action in response to the application of a read pulse to the read wire R it will be assumed that both elements have been set to their positive remanent points $+B_R$, FIG. 1. The read pulse is of such an amplitude that the changes in magnetic state which it produces in an element are reversible. Due to the direction in which the read wire R threads the two elements, it causes the magnetic state of element 1 to change from $+B_R$ to $B_1$, and the magnetic state of element 2 to change from $+B_R$ to $B_2$. At the end of the read pulse, both elements return to $+B_R$. As a consequence of the shape of the hysteresis loops of the elements, the change from $+B_R$ to $B_2$ is greater than the change from $+B_R$ to $B_1$. Therefore a pulse appears on the output wire O whose amplitude is determined by the difference between these two changes. The polarity of the pulse on wire O depends on the direction in which the wires thread the elements, but it will be assumed that it is a positive pulse when the two elements are at positive remanence.

If the two elements 1 and 2 are at negative remanence, then the change of state from $-B_R$ in a negative-going direction is less than the change of state from $-B_R$ in a positive-going direction. Hence the polarity of the pulse which appears on wire O is opposite to the polarity of the pulse on O due to reading when both elements are at positive remanence. In the present case, therefore, reading when the elements are at negative remanence produces a negative pulse on wire O.

Thus the polarity of the pulse produced in the output wire O indicates the state at which the two elements have been set. Since the read pulse causes the elements to traverse only the reversible portions of their hysteresis loops, the read-out process is inherently non-destructive. Further, the amplitude of the read pulse needed for a given speed of read-out is of the order of one tenth of that needed in the conventional destructive methods. To change the state of the unit formed by elements 1 and 2, a pulse of the required direction and of an amplitude to drive the elements from one remanent point to the other remanent point is applied to the write wire W.

It should be mentioned that when a storage unit consisting of two cores is read, as described above, the read pulse actually produces two pulses on the output wire, one on its lead edge and one on its trailing edge. These pulses are of opposite polarity. The pulses specifically referred to are those produced on the leading edge of the read pulse. Thus the resultant output on the read wire is either a positive pulse followed by a negative pulse, or a negative pulse followed by a positive pulse. The read circuitry is arranged by timed pulse control to make use of whichever of these two pulses is the more convenient.

If wire W threaded element 2 in the reverse direction to that shown, the direction in which wires R and O threaded element 2 would also be reversed as indicated by the dotted oblique strokes in FIGURE 2. Hence, it will be seen that this non-destructive read-out technique can be applied to units in which the "two elements per bit" technique of our Patent Specification No. 796,488 (Ridler et al. 50–2) is used. In general, the write wire and the output wire both pass through the two elements of a unit in the same manner, while the read wire and the output wire pass through the two elements in the opposite manner. Thus, if the write wire and the output wire each pass through the elements in the same direction magnetically, the read wire passes through the elements in opposite directions magnetically (e.g., as exemplified by the solid oblique line intersecting the cores 1 and 2 in FIGURE 2), while if the write wire and the output wire each pass through the elements in opposite directions magnetically, the read wire passes through the elements in the same direction magnetically (e.g., as exemplified by the solid and dotted oblique strokes which respectively intersect the cores 1 and 2 in FIGURE 2).

FIG. 3 shows part of a co-ordinate storage array of storage units each similar to that shown in FIG. 2. Each row of storage units is threaded by a read wire R1, R2 . . . RN, which passes through the two elements of each unit in opposite directions. Each column of storage units is threaded by an output and half-write wire OW1, OW2 . . . OWM which passes through the two elements of each unit in the same direction. In addition, each row of units is also threaded by a half-write wire HW1, HW2, . . . HWN.

To read the data stored in a row of storage units, a read pulse is applied to the read wire, e.g., R2, which threads the units of that row. The result of this is that a pulse appears on the column wires OW1, OW2 . . . of each unit of the row, which pulse indicates whether the two elements of that unit had been set to positive or negative remanence. Thus these outputs indicate whether the elements were set to binary 1 or binary 0, it being assumed that positive remanence repreesnts 1 and negative remanence 0. As explained in connection with FIGS. 1 and 2, this read-out is non-destructive.

To write into the units of a row it is necessary to deal with these units one at a time. The output wires OW1 etc. are used as half-write wires, and to write into the first unit of a row, "half" pulses of the amplitude necessary to set that unit to the desired state are applied to its column wire and its row half-write wire. That is, for the first unit of row 2, HW2 and OW1 are energised in the direction appropriate to the state to which the unit is to be set. Then unit 2 is dealt with, using OW2, and HW2, and so on. This technique can also be used to alter only one or a number less than the number of units in a row of the units of a row.

To clear a row of elements before a new word is written into it, it is necessary to set all elements to 0. This is achieved either by writing 0 in all elements in accordance with the normal writing technique but using pulses of half-write amplitude but in the 0 direction, or by applying a pulse of full-write amplitude and 0 direction to the appropriate row wire.

It is to be understood that the foregoing description of specific examples of this invention is not to be considered as a limitation on its scope.

What I claim is:

1. Intelligence storage device including two substantially identical ferro-magnetic storage elements each capable of being set to either one of two remanent magnetic states, a read wire and an output wire each threading both of the elements with one of the wires passing through the elements in the same direction magnetically and the other wire passing through the elements in opposite directions magnetically, and a source of pulses coupled to said read wire, said pulses having an amplitude such that both of said elements are made to traverse only the reversible portions of their hysteresis loops, in opposite directions, so that by virtue of the different slopes of said reversible portions, the resultant output pulses produced in the output wire are of an amplitude and polarity dependent on the instantaneous magnetic state of said elements, and said magnetic states remain unaffected by said read out pulses.

2. A device as claimed in claim 1 including a write wire threading both said elements in the same sense as the output wire.

3. A device as claimed in claim 2 in which the output wire passes in the same directions magnetically through the two elements and the read wire passes in opposite directions magnetically through the two elements.

4. A device as claimed in claim 2 in which the output wire passes in opposite directions magnetically through the two elements and the read wire passes in the same direction magnetically through the two elements.

5. A device as claimed in claim 2 in which the storage elements are individual toroidal cores of ferro-magnetic material.

6. A device as claimed in claim 2 in which the storage elements are each formed by the material surrounding a hole in a plate or block of ferro-magnetic material.

7. Intelligence storage equipment including a co-ordinate array of storage devices each as claimed in claim 1 arranged in rows and columns with individual read wires threading all the elements of the devices in each row and individual output wires threading all the elements of the devices in each column.

References Cited in the file of this patent

UNITED STATES PATENTS

| | | |
|---|---|---|
| 2,666,151 | Rajchman et al. | Jan. 12, 1954 |
| 2,695,993 | Haynes | Nov. 30, 1954 |
| 2,768,367 | Rajchman | Oct. 23, 1956 |
| 2,802,202 | Lanning | Aug. 6, 1957 |
| 2,846,667 | Goodell | Aug. 5, 1958 |
| 2,958,853 | Ridler | Nov. 1, 1960 |

OTHER REFERENCES

Publication I: Thorensen et al., "A New Nondestructive Read for Magnetic Cores," August 1955.

Notice of Adverse Decision in Interference

In Interference No. 94,938 involving Patent No. 3,141,154, R. A. Hall, INTELLIGENCE STORAGE EQUIPMENT, final judgment adverse to the patentee was rendered Dec. 22, 1965, as to claims 1, 2, 3, 4, 5, 6 and 7.

[*Official Gazette February 15, 1966.*]